United States Patent [19]

Otsuka

[11] 4,325,112
[45] Apr. 13, 1982

[54] COUNTER CONTROLLED PULSE WIDTH MODULATED INVERTER

[75] Inventor: Kenichi Otsuka, Kodaira, Japan

[73] Assignee: Tokyo Shibaura Denki Kabushiki Kaisha, Kawasaki, Japan

[21] Appl. No.: 222,626

[22] Filed: Jan. 5, 1981

[30] Foreign Application Priority Data

Jan. 25, 1980 [JP] Japan ................................. 55-7517

[51] Int. Cl.³ ........................................... H02M 7/537
[52] U.S. Cl. ......................................... 363/42; 363/132
[58] Field of Search ................. 318/345 E, 722, 811; 323/283; 363/26, 41, 42, 43, 131–134

[56] References Cited

U.S. PATENT DOCUMENTS

| | | | |
|---|---|---|---|
| 3,538,420 | 11/1970 | Klein | 363/42 |
| 3,958,171 | 5/1976 | Sekino | 363/41 |
| 4,099,109 | 7/1978 | Abbondanti | 363/42 X |
| 4,153,930 | 5/1979 | Marceau et al. | 363/42 |

Primary Examiner—A. D. Pellinen
Attorney, Agent, or Firm—Oblon, Fisher, Spivak, McClelland & Maier

[57] ABSTRACT

A voltage source inverter has a main circuit with a switching device to which is connected a DC power source through a load, and a control circuit for controlling the on-off operation of the switching device. The control circuit includes a function generator for outputting a first signal representative of the voltage-time-integration value in correspondence with the phase of the load voltage, a time counter for outputting a second signal representative of total time of the integrated time of the period during which the DC voltage is applied to the load, and a comparator for comparing the first signal with the second signal. The output of the comparator controls the on-off operation of the switching device through a logic circuit and supplies a pulse-width-modulated AC voltage to the load.

7 Claims, 17 Drawing Figures

FIG. 4A: $1-\cos\theta$ 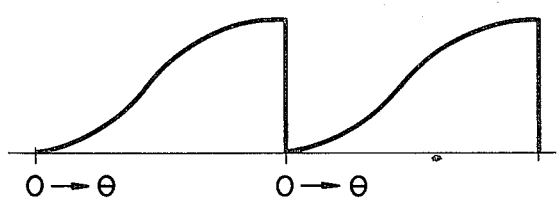
FIG. 4B: $\Sigma\Delta t_{on}$ 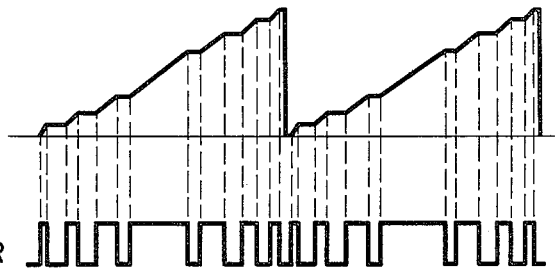
FIG. 4C: OUTPUT OF COMPARATOR 7 
FIG. 4D: GATE SIGNAL FOR $T_{11}$ 
FIG. 4E: GATE SIGNAL FOR $T_{12}$ 
FIG. 4F: GATE SIGNAL FOR $T_{21}$ 
FIG. 4G: GATE SIGNAL FOR $T_{22}$ 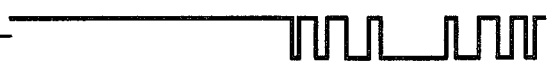
FIG. 4H: OUTPUT VOLTAGE 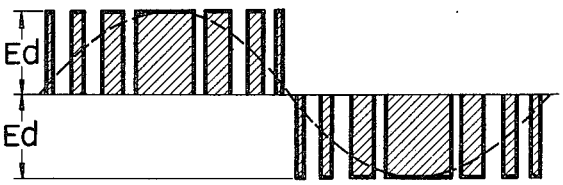

COUNTER CONTROLLED PULSE WIDTH MODULATED INVERTER

BACKGROUND OF THE INVENTION

The present invention relates to a voltage source inverter and, more particularly, to a voltage source inverter having an improved control circuit.

The output voltage waveform of the voltage source inverter is preferably a sine wave except in special cases. Various conventional means for improving the output voltage waveform have been developed and have actually been put to use. In a voltage source inverter for obtaining an AC output voltage from a DC voltage of a constant value, a typical known method for controlling the output voltage waveform is a pulse width modulation (PMW) method, according to which a sine wave output voltage that is pulse-width-modulated may be obtained. FIGS. 1A and 1C are views of waveforms for explaining the principle for obtaining the modulated sine wave by the conventional PMW method. Referring to FIG. 1A, a reference voltage signal SR1 of a sinusoidal waveform is compared with a carrier signal CW of a triangular waveform. As a result, an ON signal to be applied to switching means included in a main circuit of the inverter for applying a positive voltage between load terminals of the inverter is obtained in correspondence with a positive half-wave of the reference signal SR1 as shown in FIG. 1B. Also, an ON signal to be applied to the switching means for applying a negative voltage between the load terminals of the inverter is obtained in correspondence with the negative half-wave of the reference signal SR1 as shown in FIG. 1C. A pulse-width-modulated output voltage as shown hatched in FIG. 1D is obtained by controlling the switch means of the main circuit of the inverter by the ON signals shown in FIGS. 1B and 1C. This modulated output voltage is equivalent to a sine wave voltage SR1. In other words, the sine wave voltage SR2 is obtained in correspondence with the sinusoidal reference voltage signal SR1 as the output voltage of the inverter.

With conventional means for obtaining the modulated sine wave, it is general practice to compare the reference voltage signal SR1 of the sinusoidal waveform with the carrier signal CW of the triangular waveform as has already been described. With such a method, since it is necessary to obtain the reference voltage signal SR1 in a sinusoidal waveform by multiplying the unit sine wave with the magnitude of the voltage instruction value, a multiplying operator is required. Further, when the frequency of the carrier signal CW of the triangular waveform is kept constant, the ratio of the carrier wave frequency to output voltage frequency decreases as the frequency of the output voltage increases. Consequently, a beat frequency is superposed on the output voltage frequency. In order to prevent such problems, the output voltage frequency and the carrier signal frequency must be synchronized. Further, when the output voltage frequency is controlled within a wide range, the output voltage frequency and the carrier wave frequency need to be controlled in relation to each other. Due to this, the method for modulating the sine wave SR1 by comparing the sinusoidal reference voltage signal with the triangular carrier wave has been defective in that the construction of the voltage source inverter becomes extremely complex. Further, it has been difficult to obtain a satisfactory output waveform, that is, an output waveform of good precision, due to the limits imposed by the construction of the control circuit.

SUMMARY OF THE INVENTION

It is, therefore, the primary object of the present invention to provide a voltage source inverter in which the control circuit is simple, the precision of the output voltage waveform is improved, and the ratio of the output voltage to the output frequency is kept constant.

A voltage source inverter of the present invention has a main circuit having switching means connected via a load between buses of a DC power source; and a control switch for controlling the on-off operation of the switching means for outputting by the pulse width modulation method an AC voltage having a desired frequency and a desired waveform between the terminals of the load. This control circuit includes a function generator for outputting a first signal proportional to the voltage time-integration value of the AC voltage waveform in correspondence with the electrical angle of the AC voltage waveform; a time counter for outputting a second signal representative of the integrated time of the ON period of the switching means; a comparator for comparing the first signal with the second signal at each predetermined time; and a logic circuit for controlling the on-off operation of the switching means in response to the output of the comparator.

According to the present invention, the control circuit may be made simple, the precision of the AC voltage waveform may be improved and an AC output voltage with a desired waveform may be easily obtained.

BRIEF DESCRIPTION OF THE DRAWINGS

FIGS. 4A to 4H are views of waveforms for explicating the operation of the embodiment shown in FIG. 3;

DETAILED DESCRIPTION OF THE PREFERRED EMBODIMENTS

Figure 1A:
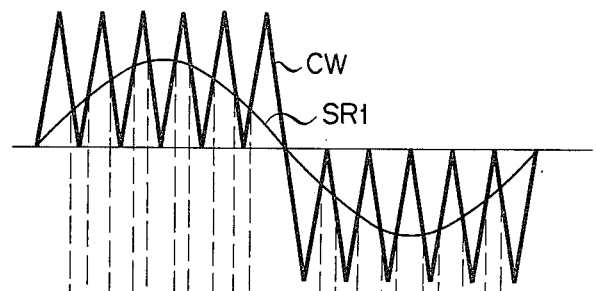
FIGS. 1A to 1D are views of waveforms illustrating the principle of conventional pulse width modulation control.
Figure 1B:
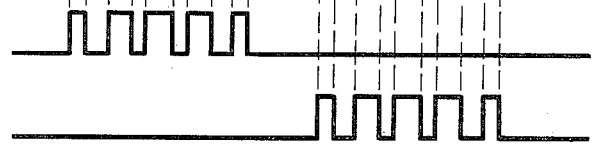
Figure 1C:
Figure 1D:
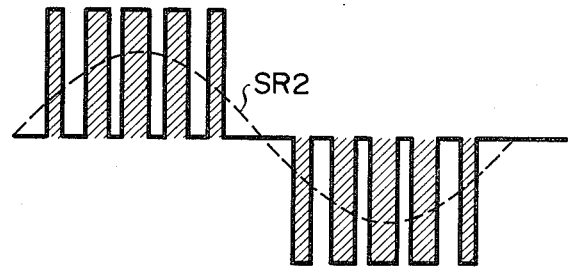
Figure 2:
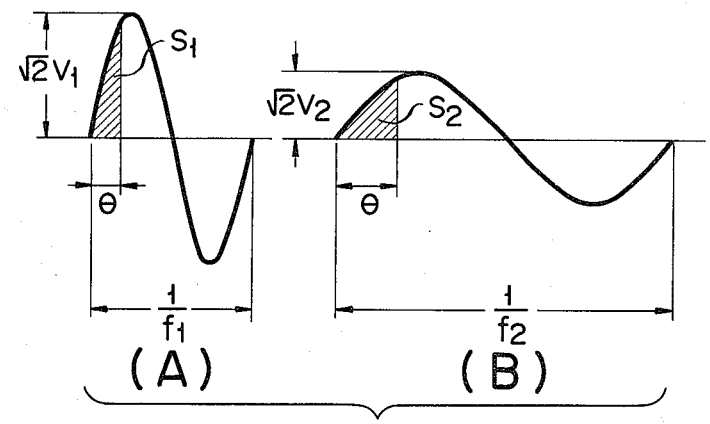
FIG. 2 shows sine waves for explaining voltage-time-integration values.

Before describing the first embodiment of the present invention, the principle of the present invention will be described with reference to FIG. 2. In general, an instantaneous voltage value $e_0$ of a sine wave voltage with effective value $v_0$ and frequency $f_0$ may be represented by equation (1) below:

$$e_0 = \sqrt{2}\, V_0 \sin 2\pi f_0 t \quad (1)$$

The integrated value S of voltage with respect to time from an electrical angle $\theta$ (t=0) to an electrical angle $\theta$ $$\left(t = \frac{\theta}{2\pi f_0}\right)$$

may be represented by equation (2) below:

$$S = \int_0^{\theta} \left(\sqrt{2}\, V_0 \sin 2\pi f_0 t\right) dt \qquad (2)$$

$$= \frac{\sqrt{2}\, V_0}{2\pi f_0} (1 - \cos \theta)$$

Since $V_0$ and $f_0$ have a fixed ratio K as has been described, S may be represented by equation (3) below:

$$S = \frac{\sqrt{2}\, K}{2\pi} (1 - \cos \theta) \qquad (3)$$

In this convention, the value S is defined as "voltage-time-integration value". It is seen from equation (3) that the voltage-time-integration value may be represented as a function of the electrical angle $\theta$ independently of the voltage $V_0$ and the frequency $f_0$.

FIG. 2(A) shows the waveform of one cycle of a sine wave of high voltage $V_1$ and a high frequency $f_1$. FIG. 2(B) shows the waveform of one cycle of a sine wave of a low voltage $V_2$ and a low frequency $f_2$. The hatched areas $S_1$ and $S_2$ representing the voltage-time-integration value for the same electrical angle $\theta$ are equal. Therefore, when obtaining a sine wave output voltage with constant V/f relation from a constant DC voltage source connected to the main circuit of the inverter by turning on and off the switching means incorporated in the main circuit an AC output voltage of a desired waveform may be obtained from the main circuit by controlling the on-off operation of the switching means by a predetermined voltage-time-integration value which corresponds to an electrical angle $\theta$ of the output pulse voltage waveform. The gist of the present invention is to control the output voltage waveform of the voltage source inverter based on the principle described above. Describing it in more detail, the on-off operation of the switching means of the main circuit is controlled for obtaining a predetermined voltage-time-integration value according to the electrical angle $\theta$ of the output voltage waveform of the inverter. In other words, this invention has PWM control means for comparing voltage-time-integration values.

Figure 3:
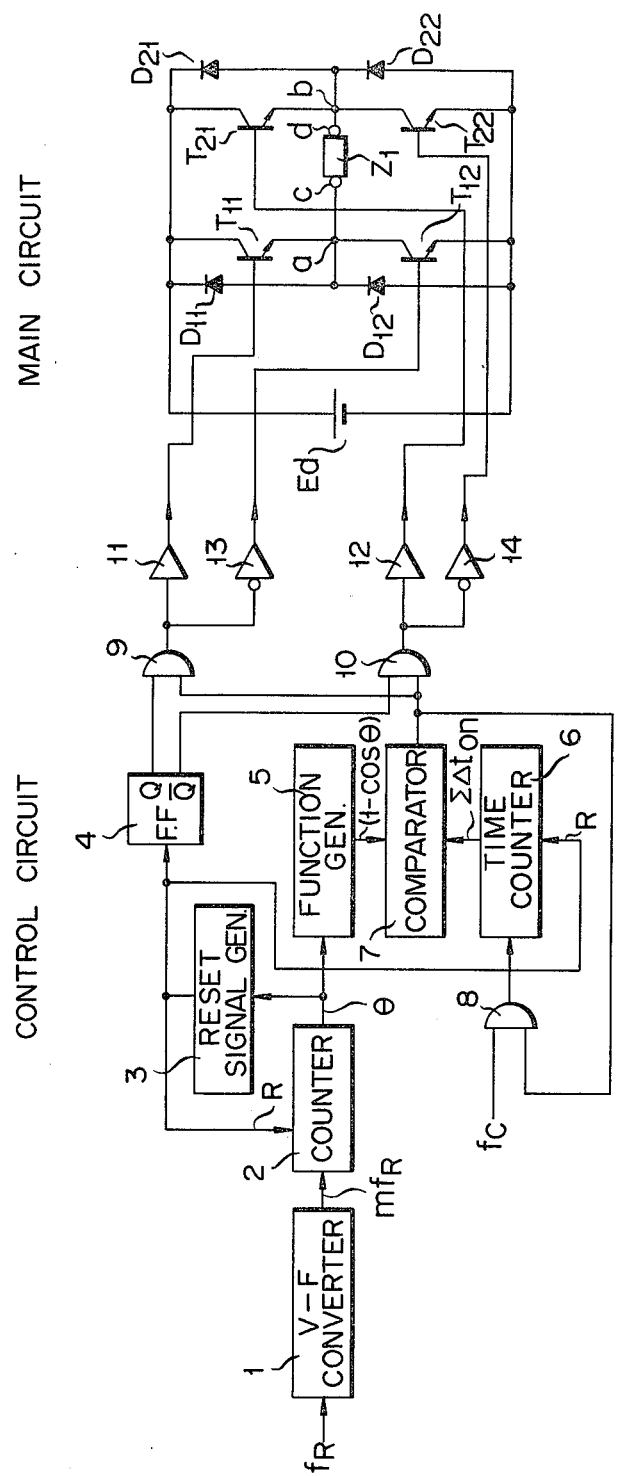
FIG. 3 is a circuit diagram according to one embodiment of the present invention.

One embodiment of the present invention will now be described with reference to FIG. 3. FIG. 3 shows an embodiment which includes a main circuit and a control circuit for obtaining a single phase sine wave voltage. The main circuit is so constructed that four semiconductor switches, each consisting of a transistor and a diode reversely connected in parallel to the transistor, are connected to form a bridge circuit between the buses of a power source Ed. A load $Z_1$ is connected between output terminals a and b of this bridge circuit through load terminals c and d. Describing one of the semiconductor switches, a transistor $T_{11}$ and a diode $D_{11}$ are connected in parallel with the polarity of the diode $D_{11}$ being opposite to that of the transistor $T_{11}$. The other semiconductor switches $(T_{12}, D_{12})$; $(T_{21}, D_{21})$ and $(T_{22}, D_{22})$ are the same as this, so their description will be omitted. In the control circuit, $f_R$ denotes a frequency reference voltage (analog voltage) proportional to the frequency of the output voltage of the inverter; numeral 1 denotes a voltage-frequency converter (to be referred to as V/F converter) for generating a pulse train $mf_R$ of a frequency proportional to the frequency reference voltage $f_R$; and numeral 2 is a counter for counting the pulses of the pulse train $mf_R$ and for generating an output representative of the electrical angle $\theta$. Numeral 3 denotes a reset signal generator for generating a reset signal R when the electrical angle $\theta$ is 180°; numeral 4, a flip-flop inverted by the reset signal R every time the electrical angle $\theta$ becomes 180°, that is, a flip-flop inverted at every half cycle of the AC voltage; numeral 5, a function generator for outputting a signal of $(1 - \cos \theta)$ (FIG. 3) according to the electrical angle $\theta$; numeral 6, a time counter for counting clock pulses $f_C$ during the time in which the switching means of the main circuit is on; numeral 7, a comparator for comparing the output of the function generator 5 with the output of the counter 6; and numeral 8, an AND gate for obtaining AND logic signals of the clock pulses $f_C$ with the output of the comparator 7 to supply an output to the time counter 6. An output $\overline{Q}$ of the flip-flop is supplied as one input to an AND gate 9, and the output of the comparator 7 is supplied as the other input to the AND gate 9. An output Q of the flip-flop is supplied as one input to an AND gate 10, and the output of the comparator 7 is supplied as the other input to the AND gate 10. The output of the AND gate 9 is supplied to the gate of the transistor $T_{11}$ through a non-inverting amplifier 11; it is also supplied to the gate of the transistor $T_{12}$ through an inverting amplifier 13. The output of the AND gate 10 is supplied to the gate of the transistor $T_{21}$ through a non-inverting amplifier 12, and is also supplied to the gate of the transistor $T_{22}$ through an inverting amplifier 14.

Since the V/F converter 1 generates the pulse train $mf_R$ proportional to the frequency reference voltage $f_R$, when the pulse number is counted by the counter 2, the contents of the counter 2 indicate the electrical angle $\theta$ at any given time. When the pulse number of the pulse train $mf_R$ is 360, for example, (360 corresponds to one cycle period of the AC output voltage), the contents of the counter 2 directly indicate the electrical angle of the output voltage in degrees. The reset signal generator 3 always supervises the contents of the counter 2; it functions to generate a reset pulse R every time the electrical angle $\theta$ becomes 180°, as well as to invert the flip-flop 4 by the reset pulse R and to reset the counters 2 and 6. Thus, the counter 2 is reset at every 180° and outputs a signal representative of the electrical angle $\theta$ taking this reset time as a reference. Since the flip-flop 4 is inverted at every 180° of the electrical angle $\theta$, the combination of the outputs Q and $\overline{Q}$ indicates whether the output of the inverter is a positive half cycle or a negative half cycle. The function generator 5 receives a signal representing the electrical angle $\theta$ and outputs a signal of the integrated value $(1 - \cos \theta)$ from $\theta = 0$ to $\theta = \theta$ (FIG. 2). This value of $(1 - \cos \theta)$ is a signal proportional to the voltage-time-integration value from $\theta = 0$ to $\theta = \theta$ when the output voltage waveform of the inverter is represented by $\sin \theta$, and this signal value of $(1 = \cos \theta)$ is the reference signal for the voltage-time-integration value. The AND gate 8 is closed during the time in which the output of the comparator 7 is "1" (to be described in more detail later), that is, the switch of the main circuit is on and a DC voltage Ed is applied to the load $Z_1$. Thus, the time counter 6 is reset when $\theta = 0$, and counts the clock pulses $f_C$ while the AND gate 8 is closed (enabled). The contents of the time counter represent the sum $\Sigma \Delta \theta_{on}$ of the time during which the DC voltage Ed is applied to the load from the time $\theta=0$. This $\Sigma \Delta \theta_{on}$ becomes a feedback signal for the signal $(1-\cos \theta)$ representative of the voltage-time-integration value.

Since the ratio V/f of the output voltage of the inverter to the frequency is fixed, the reference signal to be compared becomes Ed $(1-\cos \theta)$, and the feedback signal becomes $Ed\Sigma \Delta t_{on}$ where $\Delta t$ represents one sampling period represented by $1/f_C$ and $\Delta t_{on}$ represents one sampling period in which the voltage Ed is applied to the load $Z_1$. The comparator outputs "1" when Ed $(1-\cos \theta) > Ed\Sigma \Delta t_{on}$; it outputs "0" when Ed $(1-\cos \theta) \leq Ed\Sigma \Delta t_{on}$. When the output condition of the flip-flop 4 is such that $Q=$"1" and $\overline{Q}=$"0", the output voltage from the inverter is the positive half cycle. Under this condition, the transistor $T_{21}$ is off, the transistor $T_{22}$ is on and the terminal b of the load $Z_1$ is connected to the negative terminal of the DC power source Ed. When the output of the comparator 7 becomes "1" under this condition, the transistor $T_{11}$ is on, the transistor $T_{12}$ is off, and the positive terminal of the DC power source Ed is connected to the terminal c of the load. The DC voltage Ed is thus applied to the load $Z_1$. When the output of the comparator 7 is "0", the transistor $T_{11}$ is off, the transistor $T_{12}$ is on, and the load terminals c and d are short-circuited so that the DC voltage Ed is not applied to the load $Z_1$. A similar symmetrical on-off control is performed according to the output condition of the comparator 7, and the pulse-width-modulated AC voltage is supplied between the load terminals c and d during the negative half cycle of the load voltage when the output condition of the flip-flop 4 is such that $Q=$"0" and $\overline{Q}=$"1".

FIGS. 4A to 4H show that the waveforms of each part of FIG. 3 when the maximum frequency reference voltage $f_R$ is supplied. In this case, the maximum output voltage is supplied from the relation V/f=const. FIG. 4A shows the waveform of $(1-\cos \theta)$ proportional to the output of the function generator 5, that is, the voltage-time-integration value. FIG. 4B shows the lapse of time $\Sigma \Delta t_{on}$ corresponding to the electrical angle $\theta$ of the contents of the time counter 6. The counter 6 counts the clock pulses $f_C$ so that $\Sigma \Delta t_{on}$ increases during a time period in which the relation $(1-\cos \theta) > \Sigma \Delta t_{on}$ is established, and it holds the value of $\Sigma \Delta t_{on}$ during a time period in which the relation $(1-\cos \theta) \leq \Sigma \Delta t_{on}$ is established. FIG. 4C shows the output levels of the comparator 7 corresponding to a given electrical angle $\theta$. FIGS. 4D to 4G show the gate signals supplied to the respective gates of the transistors $T_{11}$, $T_{12}$, $T_{21}$ and $T_{22}$. The pulse-width-modulated voltage to be applied between the terminals c and d of the load $Z_1$ is shown by the hatched area in FIG. 4H. The mean voltage of the hatched part is equivalent to a sine wave represented by the dotted line and is represented by Ed sin $\theta$.

The time counter 6 counts the clock pulses $f_C$ to follow the reference voltage-time-integration value $(1-\cos \theta)$, and its following precision becomes $$\pm \frac{1}{f_C}.$$

Thus, the following precision of the counter 6 is improved as the frequency of the clock pulses $f_C$ is made greater, and the output voltage waveform of the inverter as the average voltage approaches sine wave.

Figure 5A:
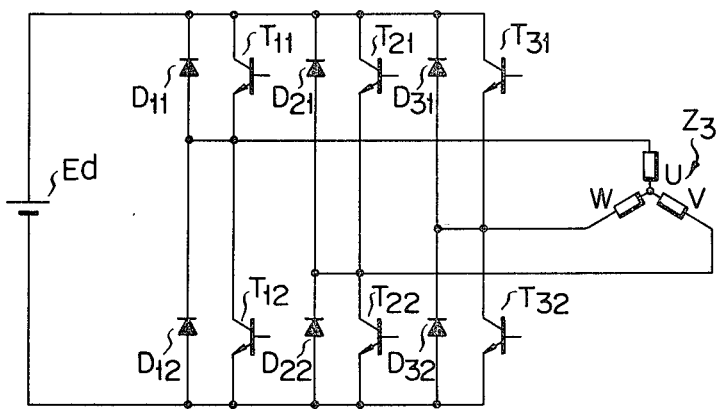
FIGS. 5A and 5B are circuit diagrams of another embodiment of the present invention.
Figure 5B:
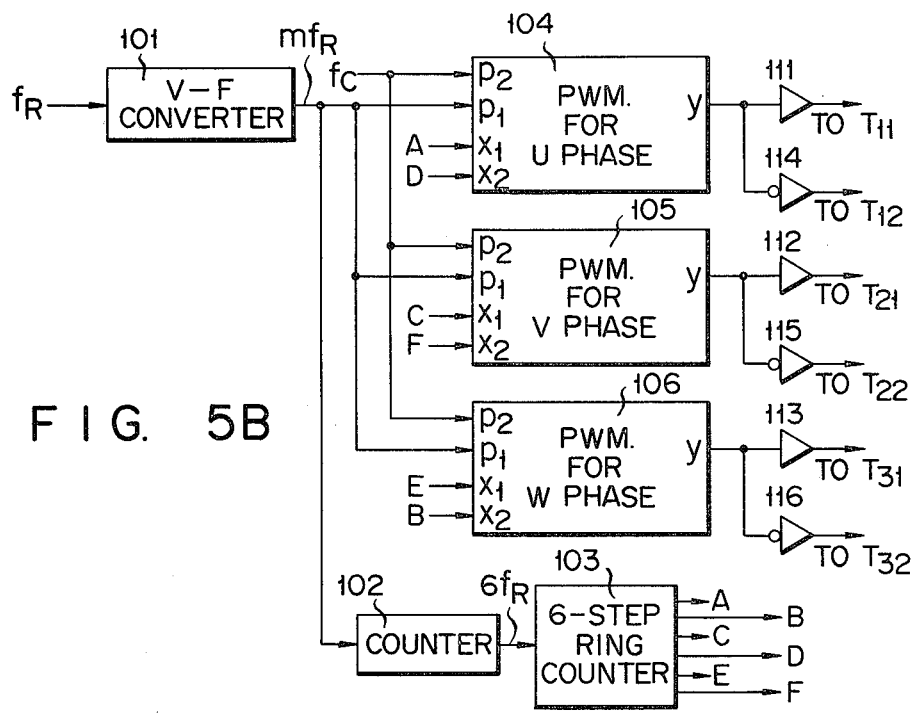

Another embodiment in which the present invention is applied to a 3-phase voltage source inverter will be described with reference to FIGS. 5A, 5B and 6. FIG. 5A shows the main circuit of a typical 3-phase inverter having switching transistors. Six switches are formed by the transistors $T_{11}$, $T_{12}$, $T_{21}$, $T_{22}$, $T_{31}$ and $T_{32}$ and the diodes $D_{11}$, $D_{12}$, $D_{21}$, $D_{22}$, $D_{31}$ and $D_{32}$. These switches are connected between the buses of the DC power source Ed through a load. Load $Z_3$ is a 3-phase load having loads U, V and W, and the respective load terminals are connected to the six switches in the manner shown in the figure. 3-phase AC voltages are obtained by controlling the voltage to be applied to the terminal of the load U by controlling the on-off operation of the transistors $T_{11}$ and $T_{12}$, by controlling the voltage to be applied to the terminal of the load V by controlling the on-off operation of the transistors $T_{21}$ and $T_{22}$ with a 120° phase shift, and by controlling the voltage to be applied to the terminal of the load W by controlling the on-off operation of the transistors $T_{31}$ and $T_{32}$ with a further 120° phase shift. FIG. 5B is a block diagram of the control circuit for controlling the main circuit shown in FIG. 5A. Referring to FIG. 5B, $f_R$ denotes the frequency reference voltage (analog) which is proportional to the frequency of the output signal of the inverter. Numeral 101 denotes a V/F converter for outputting a pulse train $mf_R$ of a frequency proportional to the reference voltage $f_R$; 102 denotes a counter for counting the pulses of the pulse train $mf_R$ and for generating a signal each time the electrical angle becomes 60°, that is, for generating six signals, $6f_{RS}$, per cycle. Numeral 103 denotes a 6-step ring counter for generating six signals A to F per cycle. Numerals 104 to 106 are pulse width modulators; their details will be described later with reference to FIG. 6. Numerals 111 to 113 denote non-inverting amplifiers and 114 to 116 denote inverting amplifiers which are connected to the pulse width modulators (PWM) 104 to 106 in the manner shown in the figure. The outputs of non-inverting amplifiers 111, 112 and 113 are supplied to the gates of the transistors $T_{11}$, $T_{21}$ and $T_{31}$, and the outputs of the inverting amplifiers 114, 115 and 116 are supplied to the gates of the transistors $T_{12}$, $T_{22}$ and $T_{32}$.

The pulse train of pulses proportional to the frequency reference voltage $f_R$ is outputted from the V/F converter 101, and the counter 102 counts these pulses and generates $6f_R$ pulses at every 60° of electrical angle. These pulses $6f_R$ are supplied as an input to the 6-step ring counter 103. The outputs A, B, C, D, E and F are shifted at every 60° of the electrical angle. When the rising edge of the output signal A is the start of the positive voltage period of the U phase, the output signal B rises at the start of the negative voltage period of the W phase, the output signal C rises at the start of the positive voltage period of the V phase, the output signal D rises at the start of the negative voltage period of the U phase, the output signal E rises at the start of the positive voltage period of the W phase, and the output signal F rises at the start of the negative voltage period of the V phase. Numerals 104, 105 and 106 are each PWM (pulse width modulation) circuits of single phase, and the details of the PWM circuit of the U phase are shown in FIG. 6.

Figure 6:
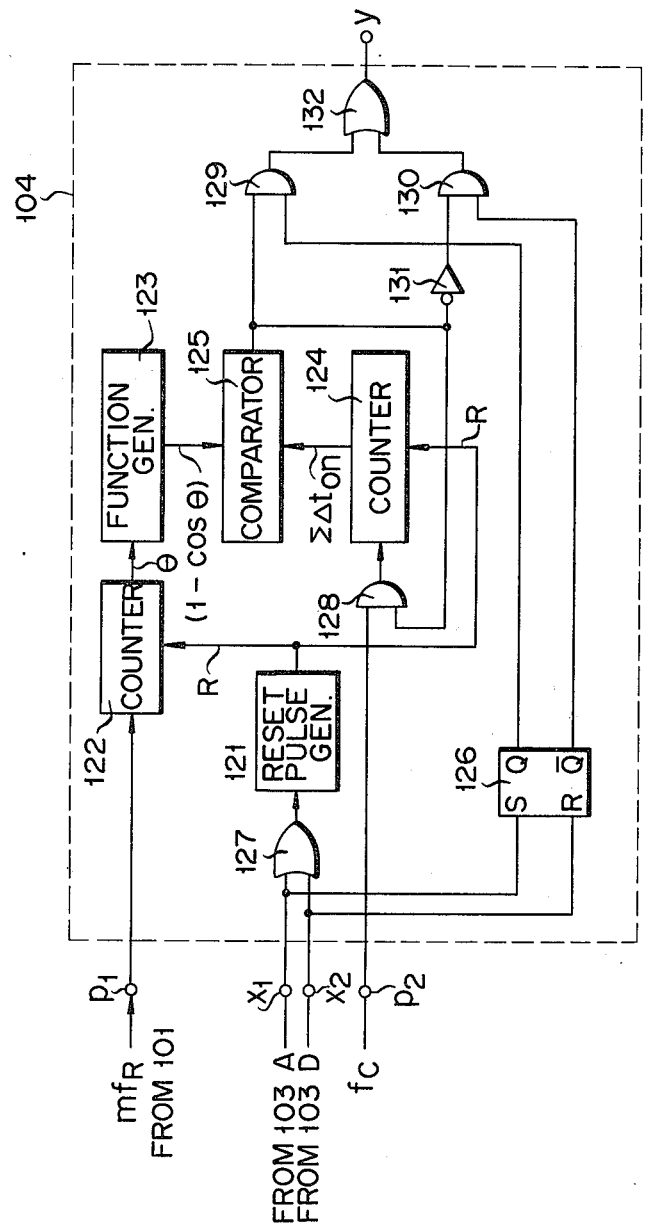
FIG. 6 is a circuit diagram of one of the pulse width modulation circuits shown in FIG. 5B.

Referring to FIG. 6, the signals A and D are supplied to a reset pulse generator 121 through input terminals $x_1$ and $x_2$ and an OR circuit 127. A reset pulse R from the reset pulse generator 121 is supplied to counters 122 and 124. The output of the V/F converter 101 is supplied to the counter 122 through an input terminal $p_1$, and the output of the counter 122 is supplied to a function generator 123. The clock pulses $f_C$ are supplied to the counter 124 through an input terminal $p_2$ and an AND gate 128. The outputs of the function generator 123 and the counter 124 are supplied to a comparator 125, and the output of the comparator 125 is supplied as a feedback signal to the AND gate 128 as well as to an AND gate 129 and an inverting amplifier 131. The signals A and D are supplied to the set terminal S and the reset terminal R of a flip-flop 126. An output Q of this flip-flop is inputted to the AND gate 129, and an output $\overline{Q}$ is inputted to an AND gate 130. The output of the inverting amplifier 131 is supplied as the other input to the AND gate 130. The outputs of the AND gates 129 and 130 are inputted to an OR circuit gate 132, and the output Y of this OR circuit is supplied to the non-inverting amplifier 111 and the inverting amplifier 114 shown in FIG. 5B. The PWM circuits 105 and 106 are constructed in a similar manner so that their description will be omitted.

When either of the signals A and D is supplied to the OR circuit 127, the reset pulse R from the reset pulse generator 121 resets the counters 122 and 124. Since the pulse train $mf_R$ having a frequency proportional to the frequency reference voltage $f_R$ is supplied to the input terminal $p_1$, the contents of the counter 122 represent the electrical angle $\theta$ of the U phase voltage. The function generator 123 outputs a signal of $(1-\cos\theta)$ proportional to the voltage-time-integration value corresponding to the input $\theta$ and supplies it to the comparator 125. The counter 124 counts the clock pulses $f_C$ to supply to the comparator 125 the time counted value $\Sigma\Delta t_{on}$ for the period during which the DC voltage Ed is applied to the U phase. The comparator 125 outputs "1" when $(1-\cos\theta) > \Sigma\Delta t_{on}$ and "0" when $(1-\cos\theta) \leq \Sigma\Delta t_{on}$, as has been described with reference to FIG. 3. The output signal (PWM signal) of the comparator 125 has already been described with reference to FIG. 4C. The output of the comparator 125 (FIG. 4C) is rearranged, and the on-off operation of the transistors $T_{11}$ and $T_{12}$ (FIG. 5A) is controlled by a logic circuit including the flip-flop circuit 126 for outputting the signals Q and $\overline{Q}$ designating the polarity of the U phase voltage, the inverting amplifier 131, the AND gates 129 and 130, the OR circuit 132, the non-inverting amplifier 111, and the inverting amplifier 114. As a result, the pulse-width-modulated voltage is supplied to the U phase. The operation is the same as in the case of the single phase inverter described hereinabove as far as the U phase alone is concerned. The operations for the V and W phases are substantially the same as in the case of the U phase, except that the signals C and F which are 120° shifted from the signals A and D, respectively, are supplied to the V phase PWM circuit 105, and the signals E and B which are 120° shifted from the signals C and F, respectively, are supplied to the W phase PWM circuit 106. An output voltage of a pulse-width-modulated 3-phase sine wave is obtained from the main circuit shown in FIG. 5A.

The function generators 5 and 123 described hereinabove may comprise ROMs (read only memory) and are capable of control with high precision since all of the inverter circuits may be replaced with digital circuits. Although the output voltage was a sine wave for the purpose of explanation in the above embodiments, an output voltage of any other waveform may alternatively be obtained. In such a case, the purpose may be accomplished by storing the voltage-time-integration value of the desired waveform in the function generator. For improving the precision of the output voltage waveform, it suffices only to increase the frequency of the clock pulses to decrease the sampling period, and the control circuit need not be modified.

What is claimed is:

1. A voltage source inverter having a main circuit with switching means connected through a load between buses of a DC power source, and a control circuit controlling the on-off operation of said switching means for outputting, by pulse width modulation, an AC voltage having a desired frequency and a desired waveform between said load terminals, wherein said control circuit comprises:

a function generator for outputting a first signal proportional to the voltage-time-integration value of said AC voltage waveform in correspondence with the electrical angle of said AC voltage waveform;

a time counter for outputting a second signal representative of the integrated time of the ON period of said switching means;

a comparator for comparing said first signal with said second signal at each predetermined time; and a logic circuit for controlling the on-off operation of said switching means in response to the output of said comparator.

2. A voltage source inverter according to claim 1, wherein said function generator comprises a read only memory (ROM).

3. A voltage source inverter according to claim 1, wherein said load is a single phase load.

4. A voltage source inverter according to claim 1, wherein said load is a 3-phase load.

5. A voltage source inverter according to claim 1, wherein said control circuit further comprises:

a voltage-frequency converter for receiving a reference voltage having a magnitude proportional to the frequency of said AC voltage waveform and for converting it into a pulse train having a frequency proportional to the magnitude of said reference voltage;

a counter for counting pulses of the output pulse train from said voltage-frequency converter and for supplying an output representative of an electrical angle of said AC voltage waveform to said function generator;

a reset signal generator for generating a reset signal for resetting said counter and said time counter when said counter outputs a signal representative of a predetermined electrical angle; and an AND gate having clock pulses of a predetermined frequency as a first input and the output of said comparator as a second input, for supplying an output to said time counter, said function generator outputting said first signal corresponding to the electrical angle represented by the output of said counter, and said time counter outputting said second signal corresponding to the counted value of the output pulses of said AND gate.

6. A voltage source inverter according to claim 5, wherein said logic circuit comprises:

a flip-flop circuit whose output is inverted every time it receives a reset signal from said reset signal generator;

AND gate means to which are supplied the outputs of said flip-flop circuit and said comparator; and
inverting amplifier means and non-inverting amplifier means for supplying on-off control signals to said switching means.

7. A voltage source inverter according to claim 5, wherein said time counter counts the clock pulses supplied to said AND gate during the period in which said first signal is greater than said second signal, and holds said counted value during the period in which said first signal is smaller than or equal to said second signal.

* * * * *